United States Patent

Taomo et al.

[11] Patent Number: 5,868,377
[45] Date of Patent: Feb. 9, 1999

[54] HAND LEVER APPARATUS INCLUDING A MAIN LEVER HAVING A BRAKE PLATE CAPABLE OF PRESSING AGAINST A SUB-LEVER

[75] Inventors: Toshio Taomo, Nishitama-gum; Hisato Ohsawa, Hamura; Hirofumi Yamami, Akishima; Fumihiko Aiyama, Musashimurayama, all of Japan

[73] Assignee: Kioritz Corporation, Tokyo, Japan

[21] Appl. No.: 665,550

[22] Filed: Jun. 18, 1996

[30] Foreign Application Priority Data

Jun. 23, 1995 [JP] Japan .................................. 7-158239

[51] Int. Cl.⁶ ............................. F16K 31/44; F02D 11/04
[52] U.S. Cl. ....................... 251/294; 74/501.6; 123/398; 123/400
[58] Field of Search ..................... 123/398, 400; 74/501.6, 483 R, 489; 251/294

[56] References Cited

U.S. PATENT DOCUMENTS

| 4,570,593 | 2/1986 | Take et al. | 123/398 |
| 4,798,185 | 1/1989 | Driggers | 123/400 |
| 4,807,580 | 2/1989 | Clark | 123/398 |
| 5,511,763 | 4/1996 | Green | 251/294 |
| 5,517,967 | 5/1996 | Nakayama | 123/398 |

FOREIGN PATENT DOCUMENTS

| 34 43802 | 6/1988 | Germany . |
| 39 29441 | 7/1991 | Germany . |
| 57-47405 | 10/1982 | Japan . |

Primary Examiner—John Rivell
Attorney, Agent, or Firm—Pillsbury Madison & Sutro LLP

[57] ABSTRACT

A hand lever apparatus (throttle lever) is provided which has the automatic restoring function (automatic idle rotation opening position restoring function) to cope with accidents and steadily hold a desired operation position (intermediate opening position of a throttle valve). The hand lever apparatus has a rotationally operable main lever (30) and a sub-lever (40) rotationally operated to pull a cable (10a) connected to a driven member (CV). The main lever (30) has a brake plate (34). By pressing the brake plate (34) against an operating portion (42) of the sub-lever (40), rotation of the sub-lever (40) is regulated to hold the sub-lever (40) in a position.

8 Claims, 5 Drawing Sheets

HAND LEVER APPARATUS INCLUDING A MAIN LEVER HAVING A BRAKE PLATE CAPABLE OF PRESSING AGAINST A SUB-LEVER

BACKGROUND OF THE INVENTION

1. Field of the Invention

The present invention relates to hand lever apparatus for operating a driven member such as, for example, a throttle valve of an internal combustion engine through a cable and more particularly, to a hand lever apparatus arranged near a grip portion of a handle of a work machine such as a grass trimmer or a hedge trimmer and suited for operating the throttle valve through a throttle cable or the like.

2. Description of the Prior Art

Conventionally, in a work machine such as a grass trimmer or a hedge trimmer in which a working unit including a cutter is generally driven by an internal combustion engine, and which has the aim of adjusting the output of the driving internal combustion engine by hand, a hand lever apparatus for adjusting of the opening of a throttle valve of the internal combustion engine is arranged near a grip portion of a U-shaped handle or a bar handle provided for the work machine.

The hand lever apparatus has a throttle trigger (throttle lever) typically operated by fingers of an operator. By rotationally operating the throttle lever, the opening of the throttle valve can be adjusted through the throttle cable. The throttle valve is normally biased to a minimum opening (idle rotation opening) so that the idle rotation opening may be maintained under the intact condition in which the throttle lever is not operated when the throttle lever is operated to pull the throttle cable by a predetermined length or more to cancel out a play, the opening may be increased from the idle rotation opening to an opening for a high-speed rotation.

Two types of throttle lever apparatuses for adjusting of the opening of the throttle valve are generally known. One is an automatic idle rotation opening restoring type in which when the throttle lever is released from the rotationally operated state, the lever together with the throttle valve is automatically returned to the intact position (idle rotation opening. The other type is an idle opening non-restoring type in which when the fingers operator's are removed merely from the throttle lever, the throttle lever is not moved but can be constantly maintained at a desired rotationally operated position (see, e.g., Japanese Utility Model Publication No. 57-19944).

In the automatic idle rotation opening restoring type, when the operator's fingers are removed from the throttle lever during operation of the work machine driven by the internal combustion engine, the internal combustion engine automatically returns to the idling state. In the case where the work machine transmits power from the internal combustion engine to a working unit including a cutter through a centrifugal clutch, the centrifugal clutch is cut off to interrupt power transmission to the working unit under the idling state in which the rotary driving force from the internal combustion engine is decreased. Accordingly, in the event that an accident occurs during the operation of the work machine and power transmission to the working unit including the cutter must be interrupted, the throttle valve can be returned immediately to the idle rotation opening by only releasing fingers from the throttle lever. Thus, the driving of the working unit can be stopped, thereby providing that safety during operating the working unit.

In the automatic idle rotation opening restoring type, an automatic return to the idling state can be ensured by only removing the operator's fingers from the throttle lever. However a desired rotationally operated position of the throttle lever must be maintained by constantly holding or gripping the throttle lever by the opeator's fingers.

The throttle cable connecting the throttle valve and the throttle lever is tortuous in many directions on the way to the throttle lever from the throttle valve. Moreover, a return spring of the throttle valve is required to have enough strength to return the throttle valve. Accordingly, in order to maintain a desired rotationally operated position by holding the throttle lever by the operator's fingers during operation of the work machine, a force for opposing the throttle cable and tension of the return spring is needed. Unfortunately, when the throttle lever is gripped by the operator's fingers for a long time, the operator's fingers become fatigued.

More particularly, the automatic idle rotation opening restoring type requires fingers to exert strong (highly depressive) holding force on the throttle lever during its normal operation. Thus difficulties with ease of operation arise in spite of the aforementioned advantage of high safety.

In addition, it is difficult for the automatic idle rotation opening restoring type to hold the throttle valve in an intermediate opening position. More particularly, the throttle valve can be held in an intermediate opening position by keeping the gripping force exerted on the throttle lever by the operator's fingers evenly. Therefore even when the holding force is slightly changed, the opening of the throttle valve is changed by a corresponding amount and as a result, the rotational speed of the internal combustion engine is changed. Accordingly, as soon as the operator's fingers gripping the throttle lever becomes fatigued during operation the throttle lever gripped by the operator's fingers and the gripping force is weakened, the rotational speed of the internal combustion engine is changed and a desired output (rotational speed) suitable for the working unit can hardly be obtained.

SUMMARY OF THE INVENTION

The present invention contemplates the elimination of the above problems. It is therefore an object of the present invention to provide a hand lever apparatus (throttle lever) which has the automatic restoring function (automatic idle rotation opening position restoring function) to cope with an accident and which can also be held steadily at a desired operation position (e.g., as an intermediate opening position of the throttle valve).

To accomplish the above object, a hand lever apparatus according to the present invention has a rotationally operable main lever and a sub-lever rotationally operated to pull a cable connected to a driven member. The main lever has a brake plate and by pressing against the brake plate to an operating portion of the sub-lever, the rotation of the sub-lever is regulated to hold the sub-lever in a position. Preferably, the hand lever apparatus may be used as an operating lever for adjusting the opening of a throttle valve of an internal combustion engine.

In one form of the hand lever apparatus, the main lever has substantially a L-letter form and includes a bent intermediate portion, the brake plate at one end and a grip portion at the other end. The main lever is pivoted on a pivotal axis at the bent portion to be rotatably mounted to a hold cover. The sub-lever has substantially a rod form and includes a base and the operating portion. The sub-lever is pivoted on a pivotal axis extending in a direction different from that of the pivotal axis for the main lever at the base to be rotatably mounted to the hold cover.

In the hand lever apparatus according to the present invention constructed as above, when the main lever is rotated by gripping the grip portion of the main lever by the operator's fingers, the brake plate of the main lever presses the operating portion of the sub-lever and the sub-lever is prevented from moving by depressive brake force of the brake plate.

Under the above condition in which the main lever is gripped by the operator's fingers, a front end of operating portion of the sub-lever is pushed by a finger (thumb) not participating in the gripping in opposition to the depressive brake force of the brake plate, thereby rotationally moving the sub-lever. The rotational movement of the sub-lever pulls the cable, so that the cable is pulled by a predetermined length to actuate the driven member. Even when the pushing force by the finger is released from the operator's front end of the operating portion in the course of moving the sub-lever, the sub-lever, which has been pressed for braking by the brake plate of the main lever, is held in a position at which the pushing force exerted by the finger on the operating portion is released and the driven member is held in the acted position.

In the event that an accident occurs under this condition and operation is desired to be stopped immediately, the main lever is released from the gripping by removing the operator's fingers from the grip portion of the main lever. Through the release operation, the brake plate of the main member is moved to release the depressive braking force exerted on the sub-lever. By this releasing operation, the sub-lever is moved immediately to weaken the tractive force for the cable, bringing the driven member into the unacted condition.

In this manner, the tractive movement of the cable is affected by the sub-lever, the sub-lever is moved and held in position by means of the main lever and the tractive position of the sub-lever can be adjusted while the main lever being gripped, thereby ensuring that the main lever can always be gripped and operated under the same condition and the fatigue of the operator's fingers can be lessened.

As soon as the main lever is released from gripping, the driven member can be restored immediately to the unacted position.

DESCRIPTION OF THE PREFERRED EMBODIMENTS

The present invention will now be described by way of example with reference to the accompanying drawings.

Figure 1:
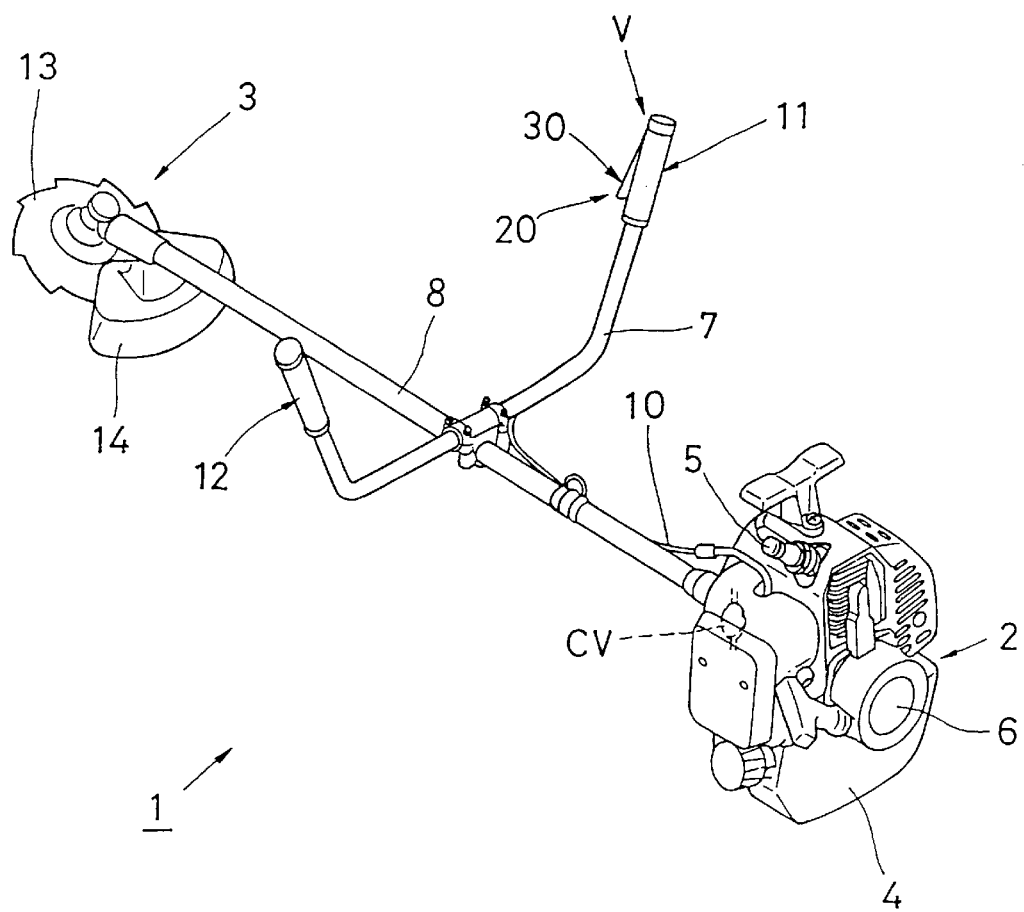
FIG. 1 is a perspective view showing an example of a grass trimmer adopting an embodiment of a hand lever apparatus according to the present invention.

Referring to FIG. 1, there is illustrated an example of a grass trimmer with a hand lever apparatus according to an embodiment of the present invention.

The shown grass trimmer, generally designated by reference numeral 1, has a U-shaped handle 7 having grip portions 11 and 12 which are spaced apart at regular intervals so as to be juxtaposed on the left and right sides. An operating rod 8 for supporting the U-shaped handle 7 has its front end mounted with a working unit 3 including a cutter 13 and a safety cover 14 and has its rear end mounted with an internal combustion engine (small-sized air-cooled two-cycle gasoline engine) 2 serving as a prime mover which drives the cutter 13 through a drive shaft (not shown) inserted in the operating rod 8. The internal combustion engine 2 is equipped with a recoil starter 6 and a fuel tank 4 and provided with a carburetor having a throttle valve CV and an ignition plug 5.

Structurally, in the present embodiment, the throttle valve CV of the carburetor is normally biased toward a minimum (idle rotation) opening and when a throttle cable 10a connected to the throttle valve CV as will be described later is pulled from its unacted location by a predetermined length or more to cancel out a play, the opening of the throttle valve begins to increase from the minimum (idle rotation) opening.

Of the set of grip portions 11 and 12, the grip portion 11 is located on the right side in FIG. 1 and typically gripped by the operator's right hand. The grip portion 11 is equipped with a hand lever apparatus 20 of the present embodiment and adapted to adjust the opening of the throttle valve CV.

Figure 2:
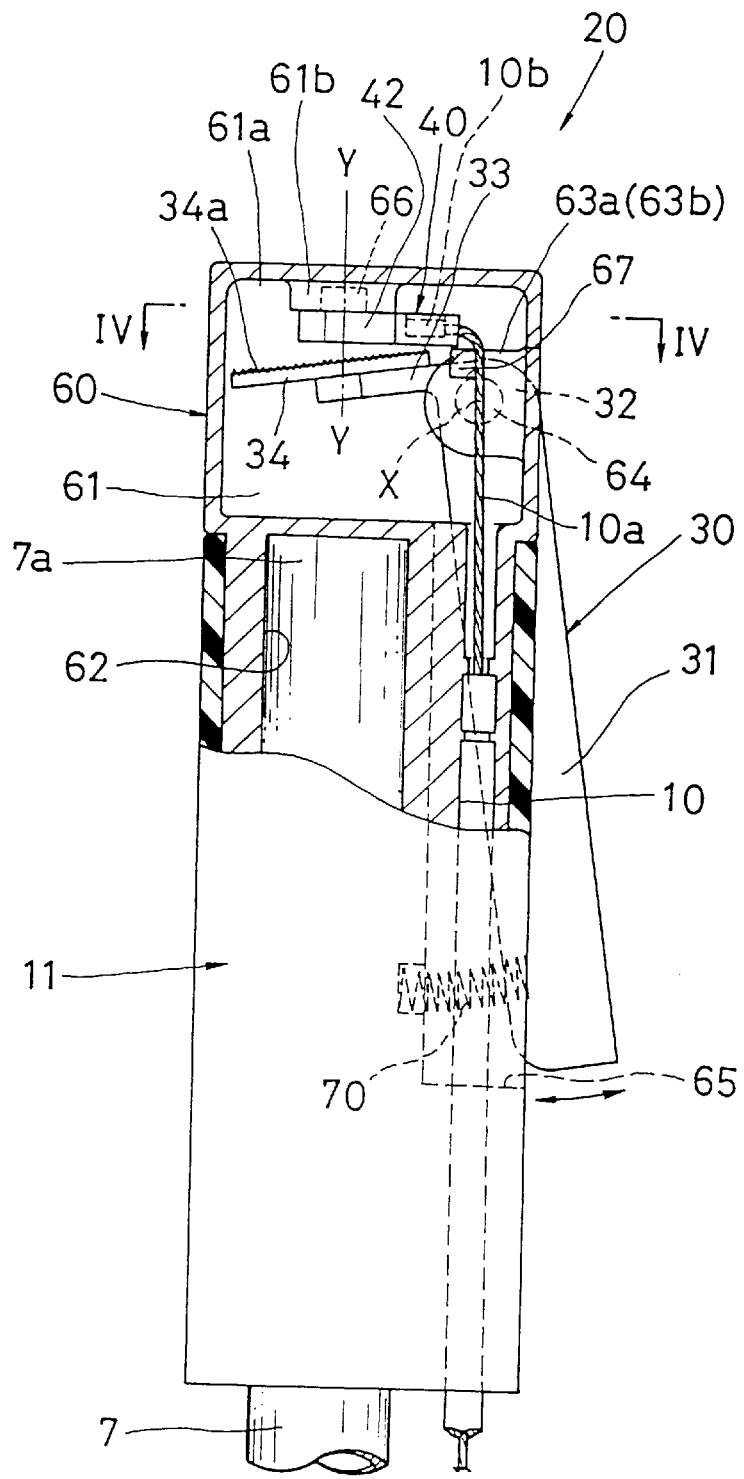
FIG. 2 is a side view, partly exploded, showing an unacted state in the embodiment of the hand lever apparatus according to the present invention.
Figure 3:
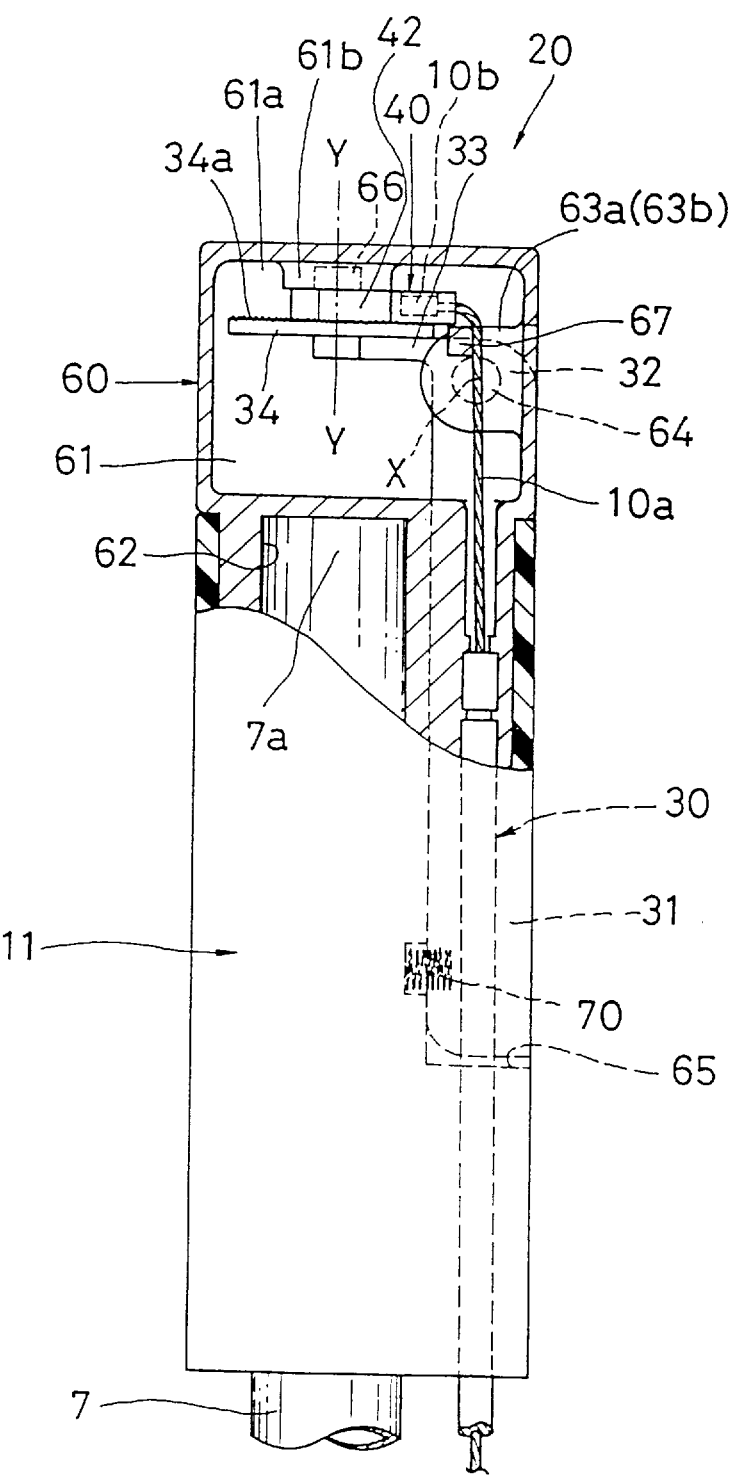
FIG. 3 is a side view, partly exploded, showing an acted state of the hand lever apparatus of FIG. 2.
Figure 4:
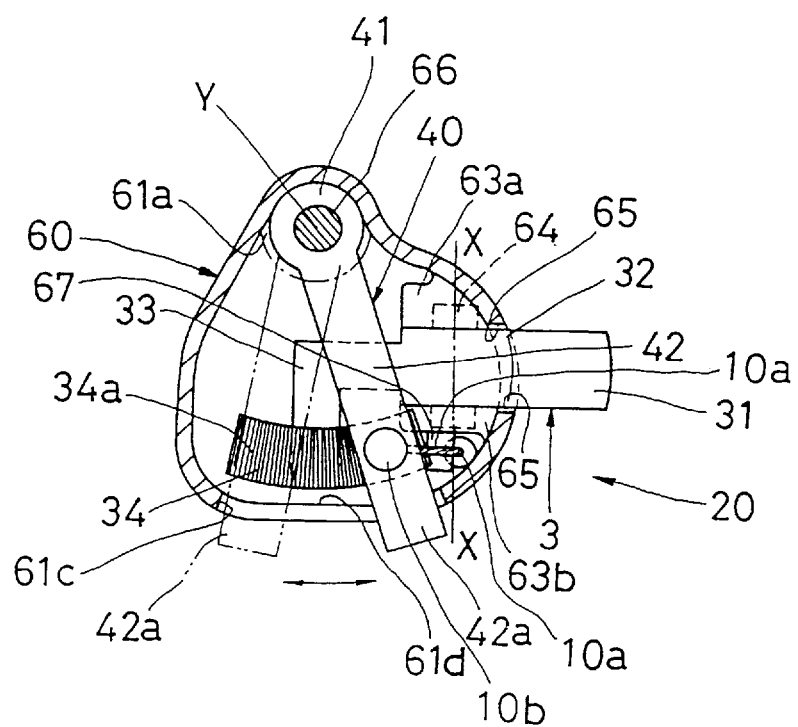
FIG. 4 is a sectional view as seen in arrow IV—IV direction of FIG. 2.

As best seen in FIGS. 2 to 4, the hand lever apparatus 20 of the present embodiment comprises a main lever 30, a sub-lever 40 and a cylindrical hold cover 60 for rotatably supporting the two levers 30 and 40. An upper end 7a of the U-shaped handle 7 is inserted in an inner cylinder 62 of the hold cover 60 so as to be fixedly mounted thereto. Formed in the hold cover 60 is a vertically elongated opening 65 in which the main lever 30 is to be fitted.

As shown in FIGS. 2 and 3, the main lever 30 has a rotary pin 64 pivoted on a pivotal axis X-X and rotatably mounted to a set of inner projecting lugs 63a and 63b formed in an upper cavity 61 of the hold cover 60. The main lever 30 has an inverted L-letter form as seen in side view of FIG. 2, including an intermediate angle corner portion 32, a grip portion 31 extending downwards along the hold cover 60, and an operation connection link 33 horizontally extending from the angle corner portion 32 and having an L shape (see FIG. 4). A free end of the L-shaped operation connection link 33 has an upper surface which is integrally formed with an arcuate brake plate 34. The brake plate 34 has a braking undulation 34a of inner clip washer form for holding the sub-lever 40 in position. The grip portion 31 is sufficiently longer than the operation connection link 33 in order that the lever ratio can be large to permit the main lever 30 to be gripped lightly.

Interposed between a lower part of the grip portion 31 of the main lever 30 and the hold cover 60 is a weak compression coil spring 70 by which the grip portion 31 of the main lever 30 is normally biased counterclockwise as viewed in FIG. 2.

The upper cavity 61 of the hold cover 60 has one upper side wall 61a and a mount projection 61b is formed on an inner surface of the upper side wall 61a. A rotary pin 66 of the sub-lever 40 is pivoted on a pivotal axis Y-Y which is substantially orthogonal to the pivotal axis X-X of the main lever 30, so that the sub-lever 40 is rotatably mounted to the mount projection 61b so as to be rotatable in accordance with a locus of operation by, for example, the operator's thumb. The sub-lever 40 has a base 41 rotatably connected to the rotary pin 66 and an operating portion 42 extending from the base 41. The operating portion 42 extends to cross the upper surface of the brake plate 34 until it passes through a slit opening 61c formed in the other side wall 61d opposing the one side wall 61a to terminate in an externally protruding free end which serves as a finger knob 42a.

Drawn around in the hold cover 60 is a throttle (inner) cable 10a of a Bowden cable 10 having its rear end connected to the throttle valve CV of the internal combustion engine 2. A front end of the throttle cable 10a is changed in direction and guided by a guide pin 67 projecting from the inner projecting lug 63b and terminates in a terminal member 10b snugly fitted in the operating portion 42 of the sub-lever 40. When the finger knob 42a of the operating portion 42 is operated by the operator 6 finger to rotate the sublever 40 about the pivotal axis Y-Y clockwise as seen in FIG. 4, the throttle cable 10a is pulled and the throttle valve CV is operated to increase its opening.

The operation of the hand lever apparatus 20 of the present embodiment as constructed above will now be described.

Figure 5:
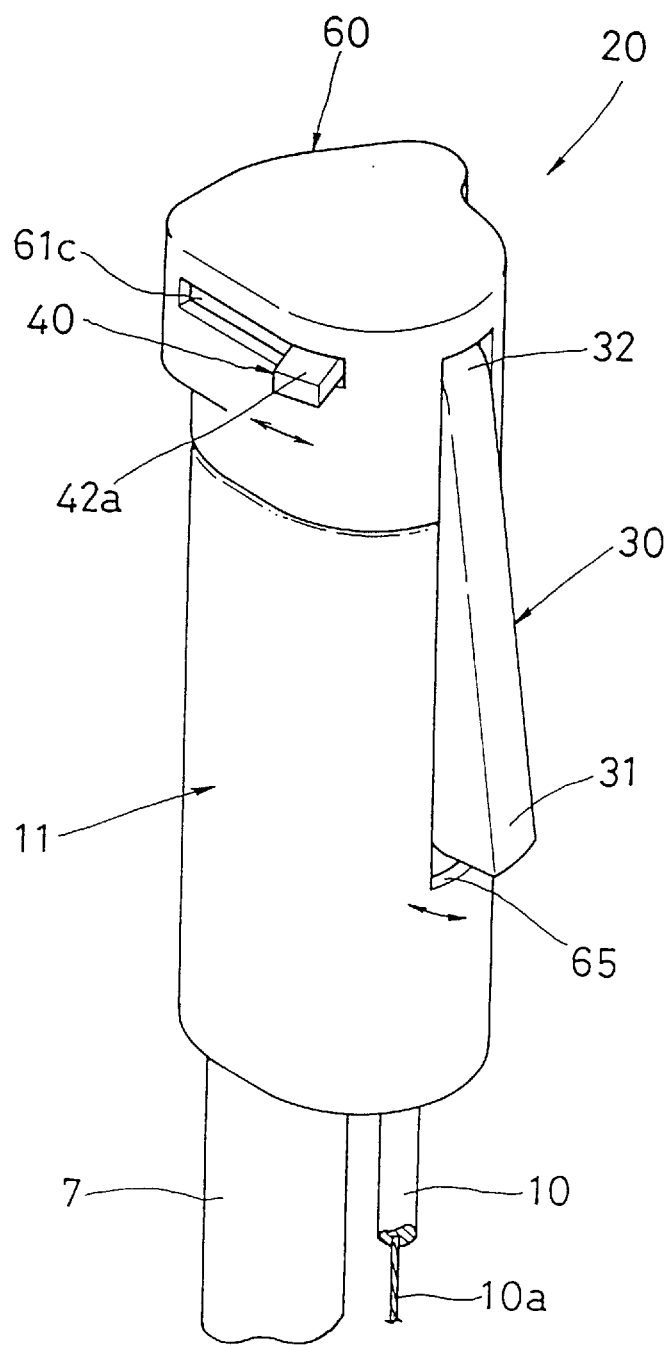
FIG. 5 is a fragmentary enlarged perspective view as seen in arrow V direction of FIG. 1.

When the internal combustion engine 2 is started with the main lever 30 and the sub-lever 40 released as shown in FIGS. 2, 4 and 5, the internal combustion engine 2 starts operating under the idle condition in which the throttle valve CV of the internal combustion engine 2 has the minimum opening (idle rotation opening). Thereafter, the grip portion 31 of main lever 30 of the hand lever apparatus 20 is gripped by fingers to rotate the main lever 30 clockwise around the rotary pin 64. By this rotation, the main lever 30 is placed in the acted position shown in FIG. 3, so that the braking undulation 34a formed on the upper surface of the brake plate 34 of the main lever 30 presses against the lower surface of the operating portion 42 of the sub-lever 40, thus permitting the brake plate 34 to regulate the rotational movement of the sub-lever 40. In this phase, the sub-lever 40 is not rotationally moved yet and consequently, the internal combustion engine 2 remains operated under the idle condition.

Under this condition in which the main lever 30 is gripped by the operator's fingers, the finger knob 42a of the sub-lever 40 is pushed by the operator's thumb which does not participate in the gripping so as to be rotationally moved from solid-line position to phantom-line position in FIG. 4 against the depressive braking force of the brake plate 34. Through the rotational movement of the sub-lever 40, the throttle cable 10a is pulled so as to be pulled forwards by a predetermined length and the throttle valve CV of the internal combustion engine 2 is operated to increase its opening from the minimum opening (idle rotation opening). Even when the depressive force exerted by the operator's finger on the finger knob 42a is released in the course of the rotational movement of the sub-lever 40, the sub-lever 40 being under the control of depressive braking by means of the brake plate 34 of the main lever 30 is held in a position at which the depressive force on the finger knob 42a is released, thus keeping the throttle valve CV opened suitably.

As the sub-lever 40 is further rotated to be moved to the phantom-line position in FIG. 4, the throttle cable 10a is further pulled to maximize the opening of throttle valve CV of the internal combustion engine 2, thereby permitting the internal combustion engine 2 to exert the maximum output. Under this condition, an operation such as trimming is carried out at the maximum output.

In the event that an accident occurs under this condition and the rotational speed of the internal combustion engine 2 is desired to be greatly decreased immediately to ensure idle operation, the operation's fingers are removed and released from the grip portion 31 of the main lever 30. Through this release, the main lever 30 is rotationally moved from the state of FIG. 3 to the state of FIG. 2 and the brake plate 34 of the main lever 30 is moved downwards to release the depressive braking force exerted on the sub-lever 40. This release operation causes the sub-lever 40 to immediately move to the solid-line position in FIG. 4 to thereby release the tractive force exerted on the throttle cable 10a. As a result, the throttle valve CV is returned to the minimum opening to bring the internal combustion engine 2 into the idle rotation condition.

In the grass trimmer 1 of the present embodiment, since rotary drive force of the internal combustion engine 2 is transmitted to the working unit 3 includes a cutter 13 through a centrifugal clutch not shown, the centrifugal clutch is automatically cut off to interrupt power transmission to the working unit 3 and driving of the working unit 3 including the cutter 13 is immediately stopped.

One embodiment of the present invention has been set forth so far in detail but the present invention is in no way limited to the foregoing embodiment and can be changed in design in various ways without departing from the spirit of the present invention as recited in the appended claims.

For example, while the hand lever apparatus of the present invention is described, in the foregoing embodiment, as being adapted for adjustment of the opening of the internal combustion engine throttle valve of a work machine, the foregoing embodiment is not limitative and obviously, the hand lever apparatus can be widely utilized to act as an operating lever of another apparatus with a handle.

As can be seen from the foregoing description, in the hand lever apparatus of the present invention, the main lever and the sub-lever are provided and the rotational movement position of the sub-lever operative to pull the cable standing for an object to be operated is held by gripping operation of the main lever, whereby by rotationally moving the sub-lever while gripping the main lever, the cable standing for the operated object can be held in a suitable pull position.

Gripping of the main lever can be done lightly during working and fingers gripping the main lever can be less fatigued.

Further, when the hand lever apparatus is used as an operating mechanism for opening the throttle valve of the internal combustion engine, the throttle valve can be returned immediately to the minimum opening (idle rotation) position by removing the operator's fingers from the main lever, thus ensuring high safety.

What is claimed is:
1. An apparatus comprising:
    a rotationally operable main lever; and
    a sub-level rotationally operated to pull a cable connected to a driven member;
    wherein said main lever has a brake plate which is capable of being positioned to press against an operating portion of said sub-lever; and
    said sub-lever is capable of being rotationally operated in a rotational range to pull said cable and being held at any desired position in said range while said brake plate is positioned to press against said operating portion of said sub-lever.
2. An apparatus according to claim 1, wherein said driven member is a throttle valve of an internal combustion engine.
3. An apparatus comprising:
    a rotationally operable main lever; and
    a sub-lever rotationally operated to pull a cable connected to a driven member;

wherein said main lever has a brake plate and by pressing said brake plate to an operating portion of said sub-lever, rotation of said sub-lever is regulated to hold said sub-lever in a position;

said main lever has a substantial L-letter form and includes a bent intermediate portion, said brake plate at one end and a grip portion at the other end;

said main lever is pivoted on a pivotal axis at said bent portion to be rotatably mounted to a hold cover;

said sub-lever has a substantial rod form and has a base and said operating portion; and said sub-lever is pivoted on a pivotal axis extending in a direction different from that of the pivotal axis for said main lever at said base to be rotatably mounted to said hold cover.

4. An apparatus according to claim 3, wherein said driven member is a throttle valve of an internal combustion engine.

5. An apparatus comprising:

a rotationally operable main lever; and a sub-lever rotationally operated to pull a cable connected to a driven member;

wherein said main lever includes a brake plate having an upper surface and by pressing said upper surface of said brake plate against a lower surface of said sub-lever, rotation of said sub-lever is regulated to hold said sub-lever in a position.

6. An apparatus according to claim 5, wherein said upper surface of said brake plate is undulated.

7. An apparatus comprising:

a rotationally operable main lever; and a sub-lever rotationally operated to pull a cable connected to a driven member;

wherein said main lever has a brake plate and by pressing said brake plate to an operating portion of said sub-lever, rotation of said sub-lever is regulated to hold said sub-lever in a position; and said main lever is rotationally operated around a first axis and said sub-lever is rotationally operated around a second axis, said first and second axes extending in different directions.

8. An apparatus according to claim 7, wherein said first and second axes are substantially orthogonal.

* * * * *